(12) United States Patent
Wagner

(10) Patent No.: US 8,091,309 B2
(45) Date of Patent: *Jan. 10, 2012

(54) INSULATION CONTAINING INORGANIC FIBER AND SPHERICAL ADDITIVES

(75) Inventor: Christophe Wagner, Lansdale, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/619,850

(22) Filed: Nov. 17, 2009

(65) Prior Publication Data

US 2010/0058697 A1    Mar. 11, 2010

Related U.S. Application Data

(63) Continuation of application No. 11/195,055, filed on Aug. 2, 2005, which is a continuation-in-part of application No. 10/869,994, filed on Jun. 17, 2004, now abandoned.

(51) Int. Cl.
E04B 1/74 (2006.01)
(52) U.S. Cl. ............... 52/407.3; 52/407.5; 52/653.1
(58) Field of Classification Search ............. 52/404.1, 52/407.3, 407.5, 309.12, 343, 344, 653.1, 52/293, 309, 414, 474, 483.1, 633, 745.05, 52/745.09, 745.1, 745.13, 309.17, 783.11, 52/783.17, 783.18, 783.19, 783.14, 783.13, 52/784.11, 783.15, 287.1
See application file for complete search history.

(56) References Cited

U.S. PATENT DOCUMENTS

| | | | |
|---|---|---|---|
| 3,769,126 A | 10/1973 | Kolek | |
| 3,849,350 A * | 11/1974 | Matsko | ............... 521/54 |
| 4,057,071 A | 11/1977 | Rhodes | |
| 4,182,681 A | 1/1980 | Gumbert | |
| 4,237,672 A * | 12/1980 | Peterson | ............... 52/742.1 |
| 4,286,210 A | 8/1981 | Ignatjev | |
| 4,289,980 A | 9/1981 | McLaughlin | |
| 4,432,956 A | 2/1984 | Zarzycki et al. | |
| 4,443,258 A | 4/1984 | Kirkhuff | |
| 4,555,447 A | 11/1985 | Sieloff et al. | |
| 4,564,547 A | 1/1986 | Hughes | |
| 4,572,864 A | 2/1986 | Benson et al. | |
| 4,870,535 A | 9/1989 | Matsumoto | |
| 4,882,485 A | 11/1989 | Duryea | |
| 5,222,375 A | 6/1993 | Conrad et al. | |
| 5,259,872 A * | 11/1993 | Shinozaki et al. | ......... 106/18.11 |
| 5,351,415 A | 10/1994 | Brooks et al. | |
| 5,385,678 A | 1/1995 | Witt | |
| 5,418,257 A | 5/1995 | Weisman | |
| 5,535,945 A | 7/1996 | Sferrazza | |
| 5,539,598 A | 7/1996 | Denison | |

(Continued)

OTHER PUBLICATIONS

Changes of Phase (or State) http://id.mind.net/~mstm/physics/mechanics/energy/heatAndTemperature/changesOfP . . . , website accessed May 6, 2004, 4 pages.

(Continued)

*Primary Examiner* — William Gilbert
(74) *Attorney, Agent, or Firm* — Duane Morris LLP

(57) ABSTRACT

The present invention provides thermal insulation products such as loose fill, batts and boards, such as duct boards and duct liner. The insulation products include randomly distributed inorganic fibers, which are supplemented with at least about five weight percent microspheres, macrospheres, or both, and preferably include hollow microspheres, which boost the insulation value of the fiberglass thermal insulation by at least about 0.5R.

8 Claims, 1 Drawing Sheet

U.S. PATENT DOCUMENTS

| | | | |
|---|---|---|---|
| 5,770,295 | A | 6/1998 | Alderman |
| 5,837,064 | A | 11/1998 | Bowers |
| 5,885,475 | A | 3/1999 | Salyer |
| 5,898,559 | A | 4/1999 | Smith |
| 5,947,646 | A | 9/1999 | Lytle |
| 5,949,635 | A | 9/1999 | Botez |
| 6,012,263 | A | 1/2000 | Church et al. |
| 6,092,375 | A | 7/2000 | Denniston |
| 6,122,477 | A | 9/2000 | Parker |
| 6,150,945 | A | 11/2000 | Wilson |
| 6,155,020 | A | 12/2000 | Deem |
| 6,262,164 | B1 | 7/2001 | Church et al. |
| 6,329,052 | B1 | 12/2001 | Groh et al. |
| 6,419,171 | B1 | 7/2002 | Takayanagi |
| 6,458,418 | B2 | 10/2002 | Langer et al. |
| 6,468,615 | B2 | 10/2002 | Weinstein et al. |
| 6,503,026 | B1 | 1/2003 | Mitchell |
| 6,507,473 | B2 | 1/2003 | Richie et al. |
| 6,620,487 | B1 * | 9/2003 | Tonyan et al. ............... 428/192 |
| 6,638,984 | B2 | 10/2003 | Soane et al. |
| 6,864,297 | B2 | 3/2005 | Nutt et al. |
| 6,949,289 | B1 | 9/2005 | Lawton et al. |
| 2003/0040239 | A1 | 2/2003 | Toas et al. |
| 2003/0087576 | A1 | 5/2003 | Yang et al. |
| 2003/0109910 | A1 | 6/2003 | Lachenbruch et al. |
| 2003/0109911 | A1 | 6/2003 | Lachenbruch et al. |
| 2004/0076826 | A1 | 4/2004 | Lee |
| 2005/0025925 | A1 | 2/2005 | O'Connor |
| 2005/0025952 | A1 | 2/2005 | Field et al. |
| 2005/0079352 | A1 | 4/2005 | Glorioso et al. |
| 2005/0176833 | A1 | 8/2005 | Tay |
| 2006/0257639 | A1 | 11/2006 | Bianchi et al. |

OTHER PUBLICATIONS

"Phase Change Drywall," U.S. Department of Energy, Office of Energy Efficiency and Renewable Energy, Consumer Energy Information: EREC Reference Briefs, Aug. 2002, 5 pages.

"Phase Change Materials for Solar Heat Storage," U.S. Department of Energy, Office of Energy Efficiency and Renewable Energy, Consumer Energy Information: EREC Reference Briefs, Mar. 2003, 6 pages.

Rubitherm® RT 26, Phase Change Material Based on n-Paraffins and Waxes, Innovative PCM's and Thermal Technology Product Information, Rubitherm GmbH, Jun. 20, 2002, 2 pages.

Rubitherm® RT 20, Phase Change Material Based on n-Paraffins and Waxes, Innovative PCM's and Thermal Technology Product Information, Rubitherm GmbH, Aug. 9, 2002, 2 pages.

Rubitherm® RT 27, Phase Change Material Based on n-Paraffins and Waxes, Innovative PCM's and Thermal Technology Product Information, Rubitherm GmbH, Jun. 20, 2002, 2 pages.

Rubitherm® PX, Latent Heat Powder Based on Paraffins and Waxes, Innovative PCM's and Thermal Technology Product Information, Rubitherm GmbH, Jul. 31, 2002, 2 pages.

Rubitherm® GR, Latent Heat Granulate Based on Paraffins and Waxes, Innovative PCM's and Thermal Technology Product Information, Rubitherm GmbH, Jul. 31, 2002, 2 pages.

PCM Thermal Solutions, Thermal Management Through the Use of Phase Change Materials (PCM's), TEAP Energy TEA 29 PCM Capsules, http://www.pcm-solutions.com/tea29.html, website accessed Apr. 12, 2004.

TH 29° C. Phase Change Material (PCM), TEAP Energy, http://www.teappcm.com/teap_29c.html, website accessed Apr. 13, 2004.

Monthly Progress Report No. 6, Contract No. DE-FG03-86SF16308, covering Nov. 1986, DOE Solar Passive Division, University of Dayton Research Institute's investigation of PCM's.

Salyer, Ival O. et al., "Advanced Phase Change Materials and Systems for Solar Passive Heating and Cooling of Residential Buildings," Final Technical Report Covering the Period of May 29, 1986 though Jul. 15, 1988, University of Dayton Research Institute.

Kedl, R.J., "Conventional Wallboard with Latent Heat Storage for Passive Solar Applications," Oak Ridge National Laboratory, Oak Ridge, TN, pp. 222-225.

Expancel, The Products, Applications, Questions & Answers, Trade Literature, Jul. 6, 2006, pp. 1-8.

Allen et al., "Advances in Microsphere Insulation Systems", CEC C2-C-01, 2003, pp. 1-8.

Carlson, Krista, "Production of Hollow Glass Microspheres from Amber Glass Frit", undated, pp. 1-7.

Rosenbusch and Holcomb, "The Benefits of Microspheres", PCI, 2004, pp. 1-4.

Watkins, Lou, "New Pipeline Insulation Technogy [sic] Introduced", Pipeline & Gas Journal, Apr. 2002, pp. 1-2.

Cuming Corp, "Thermal and Insulating Properties of Syntactic Foam", Technical Note 100-5, undated, pp. 1-2.

Hy-Tech Thermal Solutions, "Ceramic Paint Additive Makes any Paint Insulate", 2003-2004, pp. 1-4.

Therma-Guard, Trade Literature, May 5, 2005, pp. 106.

3M United States, 3M™ Glass Bubbles S32, Trade Literature, 1995-2005, pp. 1-2.

Eccotherm®, "Thermal insulation deepwater materials are used on manifolds, sleds, . . . ", Emerson Cuming Trade Literature, May 5, 2005, 1 page.

Rudd, A.F. and Lstiburek, J.W., "Vented and Sealed Attics in Hot Climates", ASHRAE Symposium on Attics and Cathedral Ceilings, Toronto, Jun. 1997, pp. 1-14.

Abaza, Hussein, "Utilizing Latent Building Thermal Mass for Dehumidification", J. Bldg Physics, vol. 29, No. 1, 37-49 (2005) Abstract, 1 pg.

"Desiccant Chart Comparisons", Sorbent Systems, 2006, pp. 1-4.

"Construction Details Insulating System, Residential Attic Spaces", Owens Corning, Aug. 1997, 4 pp.

"Energy Efficiency in Remodeling: Roofs & Ceilings", Toolbase Services, 2001-2006, pp. 1-6.

"Bulk Desiccant", AGM Container Controls, Inc., Oct. 31, 2006, pp. 1-3.

Kerestecioglu, A., M. Swami; 1990, "Theoretical and Computational Investigation of Simultaneous Heat and Moisture Transfer in Buildings: Effective Penetration Depth Theory." ASHRAE Winter Meeting, Atlanta, GA, pp. 447-454.

Gu, L., J.E. Cummings, M.V. Swami & P.W. Fairey, "Comparison of Duct Computer Models That Could Provide Input to the Proposed Thermal Distribution Standard Method of Test", Symposium of 1998 ASHRAE Winter Annual Meeting, San Francisco, 1998, pp. 1-11.

Gu, L., J.E. Cummings, M.V. Swami & P.W. Fairey 2003, "System Interactions in Forced-Air Heating and Cooling Systems, Part I: Equipment Efficiency Factors," CH-03-7-1 (RP -1165), ASHRAE Transactions 109 (1), pp. 475-484.

Gu, L., J.E. Cummings, M.V. Swami & P.W. Fairey 2003, "System Interactions in Forced-Air Heating and Cooling Systems, Part II: Continuous Fan Operation," KC-03-01 (RP -1165), ASHRAE Transactions 109 (2), pp. 371-379.

Lixing Gu "Contract Report: Examine Potential Energy Savings Using Ceiling Insulation Mixed with Desiccant" Dec. 19, 2005 (unpublished), pp. 1-35.

Huang, Y.J. et al., "Residential Heating and Cooling Loads Components Analysis", LBNL-44636, Lawrence Berkeley National Laboratory, Berkley, California, (1999), pp. 1-13.

Florida Solar Energy Center, 1992, "FSEC 3.0 User's Manual," FSEC-GP-47-92.

* cited by examiner

INSULATION CONTAINING INORGANIC FIBER AND SPHERICAL ADDITIVES

CROSS-REFERENCE TO RELATED APPLICATIONS

The present application is a continuation of U.S. application Ser. No. 11/195,055, filed Aug. 2, 2005, which is a continuation-in-part of U.S. application Ser. No. 10/869,994, filed Jun. 17, 2004 now abandoned.

FIELD OF THE INVENTION

The present invention relates to insulation products, and more specifically to loose fill insulation, batts and board products and methods of making the same.

BACKGROUND OF THE INVENTION

Thermal insulation for buildings and other structures is available in the form of mats, batts, blankets and loose fill. Mats, batts and blankets are flexible products containing randomly oriented fibers bound together with a binder, and are generally prefabricated before being brought to a construction site and installed. In contrast, loose fill thermal insulation includes a large number of discrete fibers, flakes, powders, granules and/or nodules of various materials. The loose fill can be poured or blown into hollow walls or other empty spaces to provide a thermal barrier.

Because of cost-effectiveness, speed and ease of application, as well as thoroughness of coverage in both open and confined areas, the practice of using pneumatically delivered or "blown" loose-fill insulation materials, e.g., glass fiber, rock wool, mineral fiber wool, cellulose fibers, expanded mica, and the like, has become an increasingly popular method by which to install insulation in new and existing building constructions.

Loose-fill insulation blown into attics, basements and outside wall cavities is very effective in reducing heat transfer in existing buildings. Loose-fill insulation can provide a substantial advantage over batt-type insulation in that the loose-fill material readily assumes the actual shape of the interior cavity being filled, whereas the insulative batts are manufactured in a limited number of standard size widths, none of which will as closely match the actual dimensions of wall cavities or accommodate obstructions encountered in the field. Properly installed, loose-fill insulation essentially completely fills a desired area of the building cavity, conforming to the actual shape of the building cavity, including obstructions, such as water, waste and gas lines, electrical conduits, and heating and air conditioning ducts, and provides, in that respect, effective resistance to heat transfer through walls, floors or ceilings.

Any insulation that is capable of compression has an expanded volume due to included air, within spaced apart, fibers or particles or foam of materials such as glass, polymer or cellulose. An industry standard R-value is a rating number that is printed on the insulation. The R-value refers to the extent to which the insulation reduces the rate of heat transfer through the insulation. The R-value typically increases with increases in thickness and with increases in density of the insulation for a given material. When the insulation is installed, it is capable of compression to fill a building cavity having a width, for example, on 12 inch centers, 16 inch centers, 17.7 inches or 24 inch centers. Further, the insulation is capable of compression to fill the cavity having a length defined by the width of either 9.5 inches for a 2×10 joist, or 11.5 inches for a 2×12 joist, or 13.5 inches for a 2×14 joist, or 15.5 inches for a 2×16 joist. Such a compression is in a direction transverse to the R-value and thickness, which would not substantially reduce the R-value of the insulation.

While insulation products based upon glass fibers are known, there is still a need to improve the thermal efficiency, "R", of such products in a cost effective manner.

SUMMARY OF THE INVENTION

In the first embodiment of the present invention, a fiberglass thermal insulation is provided which contains about 50-95 weight percent of randomly distributed inorganic fibers and about 5-50 weight percent microspheres. The microspheres boost the insulation value of the fiberglass insulation by at least about 0.5 R.

The present invention can provide fiberglass insulation products such as loose fill insulation, batts or duct boards, for example. When the glass microspheres, preferably hollow microspheres are added to blown loose fill insulation, the thermal performance can be boosted at least about 0.5 R by as little as 5 weight percent of hollow microspheres.

Hollow glass microspheres, such as those provided by 3M in the form of brand names K1, K20 and K25, have a density of about 0.125 g/cc-0.60 g/cc and a size of about 12-300 microns, preferably about 30-120 microns. Both plastic or inorganic, such as glass or ceramic, microspheres can be used.

In the further embodiment of the present invention, an insulation batt or board is provided which includes a fiberglass thermal insulation layer containing randomly distributed inorganic fibers, and at least 5 weight percent microspheres, the microspheres boost the insulation value of the fiberglass insulation batt or board by at least about 0.5 R. The insulation layer is joined to a facing layer, such as Kraft paper, or a polymeric layer, such as polyethylene film. In a variation of this embodiment, the microspheres can be adhered to a layer of the insulation layer, such as by applying the microspheres to the bituminous mastic used to join the facing to the insulation layer, for example.

BRIEF DESCRIPTION OF THE DRAWINGS

The accompanying drawings illustrate preferred embodiments of the invention, as well as other information pertinent to the disclosure, in which.

DETAILED DESCRIPTION

Loose Fill

Figure 1:
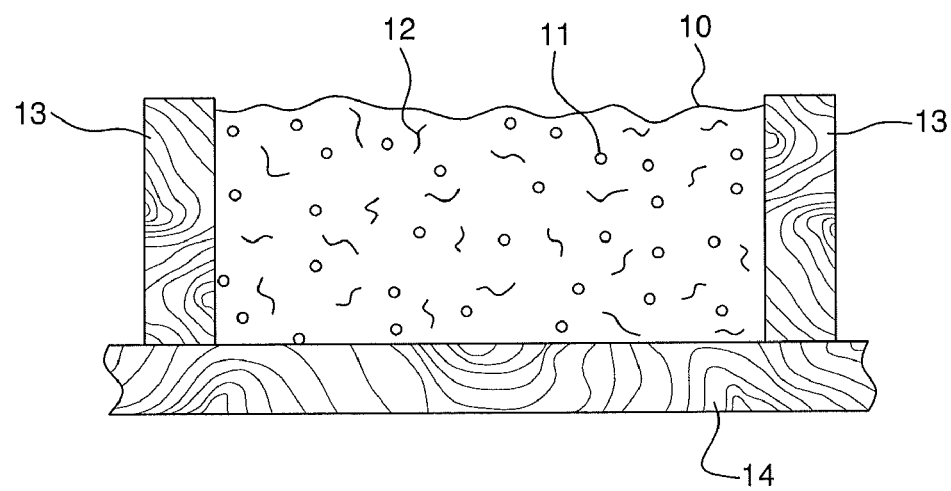
FIG. 1 illustrates loose fill insulation blown in an attic between a pair of joists.

FIG. 1 illustrates loose fill insulation 12 blown in an attic 14 between a pair of joists 13, 13. With reference to FIG. 1, a loose fill insulation product 10 having microspheres 11 dispersed therein is provided. The loose fill insulation 12 can be in the form of fibers, flakes, powders, granules and/or nodules of various materials. The loose fill insulation is of the type for insulating an interior of a hollow or open space in a building structure, e.g., a house, office, or other building structure. Preferably, the loose fill can be compressed during storage to save space, and then expanded or "fluffed-up" with air or another gas when poured or blown into a hollow wall or other empty space of a structure. The loose fill insulation 12 can include organic materials, inorganic materials or both.

Examples of organic loose fill materials include animal fibers, such as wool; cellulose-containing vegetable fibers, such as cotton, rayon, granulated cork (bark of the cork tree), redwood wool (fiberized bark of the redwood tree), and recycled, shredded or ground newspaper fibers; and thermoplastic polymer fibers, such as polyester; and expanded plastic beads. Examples of inorganic loose fill materials include diatomaceous silica (fossilized skeletons of microscopic organisms), perlite, fibrous potassium titanate, alumina-silica fibers, microquartz fibers, opacified colloidal alumina, zirconia fibers, alumina bubbles, zirconia bubbles, carbon fibers, granulated charcoal, cement fibers, graphite fibers, rock fibers, slag fibers, glass wool and rock wool. The loose fill can include one or more varieties of loose fill material. In an exemplary embodiment, the loose fill insulation includes OPTIMA® fiberglass loose fill insulation available from CertainTeed Corporation, Valley Forge, Pa.

When manufactured and compressed during storage, the loose fill particles forming the compressed loose fill are dimensioned so as to have an equivalent sphere with a diameter generally smaller than 3 cm, preferably from 0.1 to 1 cm. In one embodiment, after the compressed loose fill is decompressed, expanded and processed through a blowing hose, the loose fill particles forming the expanded loose fill are each dimensioned so as to just fit within a sphere having a diameter of from 0.1 to 4 cm, preferably from 0.5 to 2 cm.

The thermal insulation product including the microspheres 11 can be formed by dispersing, preferably uniformly, the microspheres 11 in the loose fill 12 before or at the same time as the loose fill is poured or blown into an interior, empty space of a hollow or open object, such as a hollow wall (before application of the drywall) or an attic. Methods of pouring and blowing loose fill 12 are well known in the art and will not be repeated here in detail. Generally, blowing loose fill 12 involves feeding compressed loose fill 12 into a blower where it is mixed with a gas, such as air, expanded, processed through a blowing hose, and then blown into a hollow or open structure to form thermal insulation.

In certain embodiments, a mixture including one or more microspheres 11, such as hollow plastic and glass microspheres, and a dry binder (i.e., an adhesive later activated by water at the time of installation of the loose fill) can be sprayed onto or otherwise mixed with the loose fill 10 before the loose fill 10 is compressed and/or when the loose fill 10 is decompressed. Also, a mixture including one or more microspheres 11 and a binder (i.e., an adhesive) can be mixed with the loose fill by spraying on the loose fill at or near the end of the blowing hose before the loose fill is installed in a hollow or open space wherein said hollow microspheres are permitted to settle through said randomly distributed inorganic fibers so as to concentrate on a lower portion of said cavity. The binder serves to join and hold the microspheres 11 and the loose fill insulation together. The binder can be organic or inorganic. The organic binder can include an organic water based binder such as an acrylic latex or a vinyl acetate latex. The organic binder can also include a sprayed hot melt adhesive such as a thermoplastic polymer. The inorganic binder can include an inorganic bonding agent such as sodium silicate or a hydraulic cement. Evaporation of the liquid from the liquid mixture on the loose fill 10 results in a loose fill thermal insulation 10 with the microspheres 11 and/or binder dispersed in the loose fill 10. In various embodiments, the microspheres 11 and the binder can be added to the loose fill 10 at the same time or at different times. A mineral oil can be used instead of or in addition to the binder for the purpose of dust reduction. In other embodiments, rather than providing the microspheres 11 in a liquid mixture, the microspheres 11 may be provided to the loose fill 10 in its liquid slurry state or as a powder and, optionally, along with a mineral oil and/or binder as described above.

In one preferred embodiment, loose fill insulation is fed through a loose fill transport duct into mixer to form a mixture of loose fill 12 and microspheres 11. The microspheres 11 may be provided, for example, in slurry or dry form. In embodiments, a dry binder (to be later activated by water or other material during loose fill application) and/or mineral oil can also be added in the loose fill transport duct or added in and mixed in mixer with the loose fill and phase change material. The phase change material can be added directly to the mixer and/or to the loose fill transport duct. The mixture is then fed to compressor/packager, where the mixture is compressed to remove air and increase density and packaged as compressed loose fill including the microspheres.

Microspheres

Microspheres are small solid or hollow spheres with an average diameter in the range of 12-300 microns, preferably about 15-200 microns, and most preferably about 30-120 microns. Microspheres are commonly made of glass, and are desirably made hollow for their thermal and sound insulation qualities. Borosilicate or similar glass is preferred because of its insolubility in water. Alternatively, recycled amber container glass frit is also attractive, since it can be made into hollow glass amber spheres, without the addition of a sulfur-containing compound, since sulfur is a pre-existing constituent. A number of glass microsphere grades are available, in a range of wall thicknesses, strengths, and densities from under 10 pcf to over 20 pcf, preferably about 0.125-0.60 g/cc.

Fiberglass macrospheres were created to overcome some of the limitations of glass microspheres. As their name suggests, macrospheres are relatively large, with most common diameters in the 0.125"-0.500" range. A wide selection is available of strengths and densities, in roughly the same range as glass microspheres. Macrospheres increase the overall packing factor to 70% or more, and are often less expensive than glass microspheres.

As the name implies, microspheres are small, spherical particles. Particle sizes range from 12 to 300 microns in diameter, and wall thickness can vary from several microns to as low as 0.1 micron. They can be composed of acrylonitrile, glass, ceramic, epoxy, polyethylene, polystyrene, acrylic, or phenolic materials. Because they are hollow, the true density of microspheres is lower than that of other non-soluble additives. The true density of hollow microspheres ranges from 0.60 g/cc to as low as 0.025 g/cc.

There are many potential applications for hollow glass microspheres. Sodium borosilicate hollow microspheres are often used as light-weight fillers of composite plastics for ship-building, aviation and car-making industries, sensitizing additives in manufacture of industrial explosives, varnishes, and paint fillers. In contrast to mineral and organic fillers, hollow microspheres are unique because they have a low density but high strength.

The production of hollow microspheres is a well-established technology. There are several methods available to produce hollow microspheres, but every approach depends on the decomposition of a substance known as a "blowing agent" to form a gas within in a liquid. The rapid expansion of this gaseous product causes the formation of a bubble. One of the most common methods for producing hollow microspheres is to intentionally mix a trace amounts of a sulfur-containing compound such as sodium sulfate with a sodium borosilicate glass that is similar in composition to traditional PYREX® glassware. This mixture is then dropped into a hot flame that melts the powdered glass and sodium sulfate. The melting of sodium sulfate results in a decomposition reaction that releases minute amounts of sulfur gas that form bubbles within the molten glass droplets. (Sodium sulfate additions are not necessary when waste or virgin amber glass frit is used, since sulfur-containing compounds are mainly responsible for the amber color of the glass and are already present.) The hollow droplets are then rapidly cooled from the liquid state to form hollow microspheres. As previously mentioned, such an approach relies on the intentional addition of a sulfur-containing compound to the glass.

Microspheres have found use in many applications over the years. They are widely used in the fiber-reinforced polyester industry to improve the manufacturing process of shower stalls and boats. Lighter, more-durable fiberglass products are a direct result of the creative use of microspheres. Thick-film ink, mining explosives, and rubber and plastic products of all descriptions are just a few other examples of the many products that are made better with these versatile materials. The benefits derived by these diverse end uses vary—some are unique to a specific industry, while others are common goals shared by many manufacturers.

Likewise, certain types of microspheres may offer a particular set of advantages, and a formulator must carefully select from the many products available in order to obtain the best results. For example, the compressible nature of plastic microspheres is a unique feature that is suited to elastomeric products, while glass microspheres are ideal for areas involving high temperatures and/or chemical resistance.

Plastic Microspheres

Developed in the 1970s, thermoplastic microspheres are compressible, resilient, hollow particles. The extremely thin shell wall possible with plastic spheres results in specific gravities as low as 0.025 and allows just a small weight-percent of these materials to displace large volumes when disposed in matrices. Because the resilient plastic can deform under stress, there is virtually no breakage when mixing or pumping these products, even with high shear mixing, as in the case of blowing loose fill insulation. Additionally, the compressible nature of plastic can absorb impacts that might ordinarily deform the finished product, thereby reducing damage caused by stone chips, foot traffic or freeze-thaw cycles.

Glass Microspheres

Glass bubbles were developed in the 1960s as an outgrowth from the manufacture of solid glass beads. Since they are made of glass they provide the benefits of high heat and chemical resistance. The walls of glass bubbles are rigid. Products are available in abroad range of densities from as low as 0.125 g/cc to 0.60 g/cc. The collapse strength of the glass bubble is directly related to the density, i.e., the higher the density, the higher the strength. For example, a glass bubble with a density of 0.125 g/cc is rated at 250 psi, whereas one with a density of 0.60 g/cc is rated at 18,000 psi. In order to minimize both the cost and the weight of the final product, the appropriate glass bubble is the one that is just strong enough to survive all of the manufacturing processes and the end use of the product.

Since microspheres are closed-cell, gas-filled particles, they are extremely good insulators. This characteristic is imparted to materials that contain microspheres, such as batts, boards and loose fill insulation products. As this invention demonstrates, thermal and acoustic insulation properties of batts, loose fill, facings, coatings or substrates can be improved by the addition of microspheres.

Physical Properties and Composition

The 3M Type K1 microspheres are manufactured from soda-lime-borosilicate glass and is the most economical 3M microsphere product at about $0.40 per liter. TABLES 1 and 2, below, contain selected properties of Type K1 microspheres. Trapped within the microspheres are residual gases consisting of a 2:1 ratio of $SO_2$ and $O_2$ at an absolute pressure of about ⅓ atmosphere. Amorphous silica is added at 2% to 3% by weight to the microspheres to prevent caking if exposed to water. Caking of the bulk microspheres is caused by bridging of residual salts from the manufacturing process that have condensed on the surface of the microspheres. Amorphous silica, commonly used as a desiccant, has a very high specific surface area. The relatively small percentage of amorphous silica actually makes up the majority of the overall specific surface area and causes the bulk material to have a greater capacity for adsorbed water that must be dried out before or during the evacuation process. The effect on vacuum retention following exposure of microspheres and perlite to atmospheric conditions without a drying process prior to evacuation follows this section.

Alternative glass bubbles to the Type K1 microspheres are produced by 3M and also by Emerson & Cuming. Options include a floating process that skims off low density (weak) bubbles and removes a portion of the condensed salts. A coating of methacrylaic chromic chloride is then applied that minimizes water pickup. The overall specific surface area is about half that of the Type K1 microspheres, which may allow reduced bake-out requirements due to lower water adsorption capacity. The use of thicker-walled bubbles will benefit applications where microspheres are exposed to intense localized forces.

TABLE 1. Thermal performance of 3M Type K1 microspheres

TABLE 1

Thermal performance of 3M Type K1 microspheres

| COLD VACUUM PRESSURE (torr) | APPARENT THERMAL CONDUCTIVITY (mW/m-K) | COMPARATIVE THERMAL PERFORMANCE |
|---|---|---|
| $1 \times 10^{-3}$ | 0.7 | 7.0 times worse than MLI |
| $1 \times 10^{-1}$ | 1.4 | 3.3 times better than perlite |
| 760 | 22 | 1.5 times better than polyurethane |

TABLE 2. Selected properties of 3M Type K1 microspheres

TABLE 2

Selected properties of 3M Type K1 microspheres

| | |
|---|---|
| True density | 0.125 g/cc (7.8 lb/ft³) |
| Bulk density (@ 60% packing factor) | 0.075 g/cc (4.7 lb/ft³) |
| Particle size (mean/range) | 65/15-125 microns |
| Isostatic crush strength | 1.7 MPa (250 psi) |
| Maximum operating temperature | 600° C. |
| Specific surface area | 0.2 m²/cc of bulk volume |

Fiberglass Thermal Insulation Batts and Boards

Figure 2:
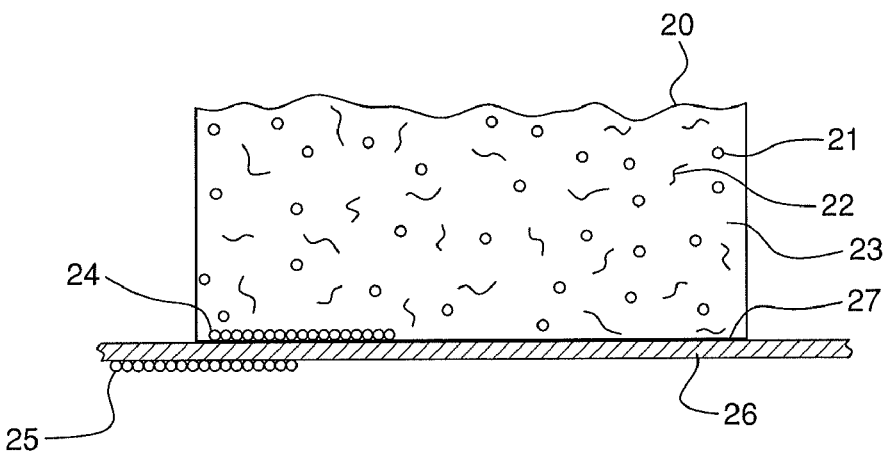
FIG. 2 illustrates an insulation batt having microspheres in three different locations.

As shown in FIG. 2, fiberglass thermal insulation batts 20, or boards, such as duct boards, duct liners, and the like, can be manufactured using the materials provided by this invention. In a further embodiment, a batt 20 is manufactured with a fiberglass insulation layer 23. The fiberglass insulation layer contains randomly distributed inorganic fibers such as glass fibers and contains about 5 weight percent microspheres 21 which can be randomly distributed among or on the inorganic or glass fibers 22. Alternatively, the microspheres can be adhered to the top or bottom layer of the insulation layer 23 or mixed with an adhesive 27, such as a resinous adhesive or bituminous mastic, used to apply the facing 26 to the fiberglass insulation layer 23. The facing can be applied to one or both major surfaces of the insulation layer 23, or can be applied to envelope the insulation layer 23. Still further, the microspheres can be adhered or made integral with the facing 26, such as by spraying, ink jet, printing or using a roll to apply an adhesive layer followed by applying the microspheres, or applying the microspheres as a slurry in such a process. When applied to the facing 26, a uniform covering of microspheres 24, 25 is desirable, but the weight percentage may be less than 5%, such as 0.5-3%, based upon the weight of the fibers or the facing 26. Alternatively, the microspheres may be applied to the top surface of the fiberglass insulation 23 by use of a binder or adhesive, or concentrated in a layer or region near the surface or in the middle of the insulation layer 23.

From the foregoing, it can be realized that this invention provides improved loose fill insulation, and batts and boards which include microspheres and/or for increasing the thermal insulation efficiency. The microspheres can be distributed within glass fibers, cellulosic particles, or adhered to facing layers or glass fibers, for example, to provide a great variety of more efficient thermal insulation products. The glass spheres of this invention also can assist in sound deadening and may assist in allowing loose fill insulation to flow through hoses used for blowing such products into attic cavities and wall spaces. Although various embodiments have been illustrated, this is for the purpose of describing, but not limiting the invention. Various modifications which will become apparent to one skilled in the art, are within the scope of this invention described in the attached claims.

What is claimed is:

1. An insulated attic, comprising:
    a plurality of joists, and a loose fill insulation between said joists, said loose fill insulation consisting of about 50-95 weight percent glass fibers which are randomly distributed with included air within spaced apart portions of said glass fibers, and about 5-50 weight percent insulating hollow microspheres and a binder, which provide a thermal insulation layer;
    said microspheres being settled so as to concentrate in a lower region of said thermal insulation layer; and
    said binder binding together respective said glass fibers to comprise a fiberglass insulation layer having said glass fibers and said included air, and said binder binding together said microspheres which are settled in said lower region with corresponding said glass fibers which are in said lower region.
2. The insulated attic of claim 1, wherein said microspheres comprise glass or plastic.
3. The insulated attic of claim 1, wherein said microspheres comprise soda-lime borosilicate glass, or recycled amber glass.
4. The insulated attic of claim 1, wherein said microspheres comprise a diameter of about 12-300 microns.
5. The insulated attic of claim 1, wherein said microspheres comprise a density of about 0.125-0.60 g/cc.
6. The insulated attic of claim 1, wherein said microspheres comprise a diameter of about 12-300 microns and a density of about 0.125-0.6 g/cc.
7. The insulated attic of claim 1, wherein said glass fibers and said microspheres are mixed.
8. The insulated attic of claim 1 wherein said microspheres are distributed with said randomly distributed glass fibers in said lower region.

* * * * *